United States Patent
McDaniel

(10) Patent No.: US 9,562,135 B1
(45) Date of Patent: Feb. 7, 2017

(54) POLYETHER CARBONATES BY DMC CATALYSIS

(71) Applicant: Covestro LLC, Pittsburgh, PA (US)

(72) Inventor: Kenneth G. McDaniel, Langhorne, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/975,982

(22) Filed: Dec. 21, 2015

(51) Int. Cl.
  *C08G 71/04* (2006.01)
  *C08G 65/26* (2006.01)
  *C08G 18/44* (2006.01)

(52) U.S. Cl.
  CPC .......... *C08G 65/269* (2013.01); *C08G 65/266* (2013.01); *C08G 65/2609* (2013.01); *C08G 65/2663* (2013.01)

(58) Field of Classification Search
  CPC ...................................... C08G 65/34
  USPC ................................. 528/371, 370
  See application file for complete search history.

(56) References Cited

U.S. PATENT DOCUMENTS

| | | | |
|---|---|---|---|
| 3,332,983 A | * | 7/1967 | Barie, Jr. ............... C07C 67/08 554/170 |
| 4,500,704 A | | 2/1985 | Kruper, Jr. et al. |
| 4,826,952 A | | 5/1989 | Kuyper et al. |
| 6,646,100 B2 | | 11/2003 | Hofmann et al. |
| 6,806,345 B2 | | 10/2004 | Hofmann et al. |
| 7,977,501 B2 | | 7/2011 | Haider et al. |
| 8,134,022 B2 | | 3/2012 | Haider et al. |

FOREIGN PATENT DOCUMENTS

WO   WO 2013028437   *   8/2013   ............ C08G 65/34

OTHER PUBLICATIONS

Darensburg, D. and Holtcamp, M.W., "Catalysts for the Reactions of Epoxides and Carbon Dioxide", Coordination Chemistry Reviews, 153, 1996, pp. 155-174.

* cited by examiner

*Primary Examiner* — Terressa Boykin
(74) *Attorney, Agent, or Firm* — N. Denise Brown

(57) ABSTRACT

This invention relates to a process for preparation of polyether alkoxylated carbonates. These products may also be referred to as polyether polycarbonates. This process simultaneously transcarbonates and alkoxylates a mixture of one or more carbonate compounds, and one more hydroxyl group containing compounds, with at least one alkylene oxide in the presence of a mixture of catalysts. The catalyst mixture contains at least one DMC catalyst and at least one non-alkaline transesterification catalyst. This invention also relates to novel polyether polycarbonates, a process for preparing polyurethane foams from these novel polyether polycarbonates and to foams comprising these novel polyether polycarbonates.

16 Claims, No Drawings

POLYETHER CARBONATES BY DMC CATALYSIS

BACKGROUND

This invention relates to a process for preparing an alkoxylated carbonate (i.e. polyether carbonate) product. This process simultaneously transcarbonates and alkoxylates a mixture of compounds with at least one alkylene oxide, in the presence of a mixture of catalysts. The present invention also relates to novel polyether carbonates.

A general review of the chemistry of polymerizing propylene oxide with carbon dioxide in the presence of a suitable catalyst to produce polycarbonate polyols is provided by D. Darensburg and M. W. Holtcamp in the article "Catalysts for the Reactions of Epoxides and Carbon Dioxide", Coordination Chemistry Reviews, 153, 1996, pp. 155-174. Cyclic carbonate and/or polycarbonate synthesis via epoxides and $CO_2$ is described, as is ring-opening polymerizations of cyclic carbonates.

Various processes have been used to prepare polyether carbonate polyols from alkylene oxides and carbon dioxide, in the presence of a DMC catalyst. One problem resulting from most of the processes is the formation of a high level of propylene carbonate which is an undesirable by-product of these processes. Efforts to overcome this problem include the combined use of a DMC catalyst with a co-catalyst, and the use of a substantially non-crystalline DMC catalyst.

In spite of the advances made recently in this area, there continues to be a need for alkoxylated carbonate products (i.e. polyether carbonates) with low levels of cyclic carbonate by-products, and new processes for preparing these alkoxylated carbonate (i.e. polyether carbonates) products. We have surprisingly found that reacting alkylene oxides with carbonates using a dual catalyst system offers a very efficient method for preparing polyether polycarbonates with very little formation of cyclic carbonate byproducts.

SUMMARY

This invention relates to a process for the preparation of a polyether carbonate (i.e. a polyether alkoxylated carbonate). This process comprises simultaneously:
(A) transcarbonating
and
(B) alkoxylating
  (1) a mixture comprising
  (a) a compound having a molecular weight of from 90 to 6000
    and which is selected from the group consisting of dialkyl carbonates, diaryl carbonates, alkylaryl carbonates and polycarbonates;
  and
  (b) one or more hydroxyl group containing compounds selected from the group consisting of (i) alcohols containing from 1 to 25 carbon atoms, (ii) polyols having a functionality of 2 to 6 and a number average molecular weight of less than 3000, and (iii) mixtures thereof;
  with
  (2) at least one alkylene oxide;
  in the presence of
  (3) a mixture of catalysts comprising
  (a) at least one DMC catalyst,
  and
  (b) at least one non-alkaline transesterification catalyst.

The present invention also relates to novel polyether carbonates. These polyether carbonates comprise the reaction product of:
(1) a mixture comprising
  (a) a compound having a molecular weight of from 90 to 6000 and which is selected from the group consisting of dialkyl carbonates, diaryl carbonates, alkylaryl carbonates and polycarbonates;
  and
  (b) one or more hydroxyl group containing compounds selected from the group consisting of (i) alcohols containing from 1 to 25 carbon atoms, (ii) polyols having a functionality of 2 to 6 and a number average molecular weight of less than 3000, and (iii) mixtures thereof;
with
(2) at least one alkylene oxide;
in the presence of
(3) a mixture of catalysts comprising
  (a) at least one DMC catalyst,
  and
  (b) at least one non-alkaline transesterification catalyst;
wherein the reaction comprises transcarbonation and alkoxylation simultaneously.

The present invention also relates to polyurethane foams comprising the reaction product of one or more polyisocyanate with a novel polyether carbonate as described above.

This invention also relates to a process for producing a polyurethane foam by reacting one or more polyisocyanate with a novel polyether carbonate as described above.

DETAILED DESCRIPTION OF THE INVENTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. §112 and 35 U.S.C. §132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise.

The present invention requires (1) a mixture comprising:
(a) a compound selected from the group consisting of dialkyl carbonates, diaryl carbonates, alkylaryl carbonates, polycarbonates and mixtures thereof, with said compound having a molecular weight of from 90 to 6000; and
(b) one or more hydroxyl group containing compounds selected from the group consisting of (i) alcohols containing from 1 to 25 carbon atoms, (ii) polyols having a functionality of 2 to 6 and a number average molecular weight of less than 3000, and (iii) mixtures thereof.

It is to be understood that the amount of (a) and (b) in the mixture (1) can vary at any ratio, but the preferred is for (b) to range from 0.1 mole % to 200 mole %, based on the moles of carbonate in compound (a).

In accordance with the present invention, suitable compounds to be used as (1)(a) are selected from the group consisting of dialkyl carbonates, diaryl carbonates, alkylaryl carbonates, polycarbonates, and mixtures thereof, in which the compounds have molecular weights of from 90 to 6000.

These compounds (1)(a) typically have a molecular weight of at least 90, preferably at least 104, and more preferably at least 118. These compounds also typically have a molecular weight of less than or equal to 6000, preferably less than or equal to 5000, and more preferably less than or equal to 4000. These compounds may have a molecular weight ranging between any combination of these upper and lower values, inclusive, e.g., from 90 to 6000, preferably from 104 to 5000, and more preferably from 118 to 4000. Suitable dialkyl carbonates for component (1)(a) include, for example, compounds such as dimethyl carbonate, diethyl carbonate, dipropyl carbonate, dibutyl carbonate, dihexyl carbonate, dioctyl carbonate, methyl ethyl carbonate, methyl propyl carbonate, etc. Preferred dialkyl carbonates are diethyl carbonate, and dimethyl carbonate.

Suitable aryl carbonates for component (1)(a) of the invention included diphenyl carbonate, ditolyl carbonate, etc. Preferred aryl carbonates are diphenyl carbonate.

Examples of suitable alkylpolycarbonates and aryl polycarbonates for component (1)(a) include compounds such as a polycarbonate based on aliphatic diols such as ethanediol, propanediol, butanediol, hexanediol, decane diol, bisphenol A, dihydroxybenzene, etc. Suitable aliphatic polycarbonate diols have molecular weights of 1000 to 4000. These polycarbonates may contain hydroxyl groups, but it is not necessary that they contain hydroxyl groups.

Cyclic carbonates are outside the scope of suitable carbonate compounds for the present invention.

Component (1)(b) of the mixture comprises one or more hydroxyl group containing compounds selected from the group consisting of (i) alcohols containing from 1 to 25 carbon atoms, (ii) polyols having a functionality of 2 to 6 and a number average molecular weight of less than 3000, and (iii) mixtures thereof. Suitable hydroxyl group containing compounds can be aliphatic hydroxyl group containing compounds, aromatic hydroxyl group containing compounds and/or cycloaliphatic hydroxyl group containing compounds.

Examples of suitable alcohols to be used as component (1)(b)(i) include methanol, ethanol, propanol, isopropanol, butanol, pentanol, hexanol, heptanol, benzyl alcohol, octanol, phenol, etc.; and compounds such as Neodol® 25 which is a blend of $C_{12}$, $C_{13}$, $C_{14}$ and $C_{15}$ high purity primary alcohols commercially available from Shell Chemical, Neodol® 91 which is a blend of $C_9$, $C_{10}$ and $C_{11}$ high purity primary alcohols commercially available from Shell Chemical, and Neodol® 23 which is a blend of $C_{12}$ and $C_{13}$ high purity primary alcohols commercially available from Shell Chemical, etc. Preferred alcohols include, for example, are $C_9$-$C_{15}$ alcohols such as Neodol 21, Neodol 25, and Neodol 91.

Suitable polyols for component (1)(b)(ii) include compounds which have functionalities of 2 to 6 and a number average molecular weight of less than 3000. In one embodiment, these polyols have functionalities of from 2 to 4 and a molecular weight in the range of from 62 to 1000. Some examples of suitable compounds include, for example, ethylene glycol, propylene glycol, diethylene glycol, dipropylene glycol, triethylene glycol, tripropylene glycol, neopentyl glycol, 1,3 propanediol, 1,4 butanediol, 1,2 butanediol, 1,3 butanediol, 2,3 butanediol, 1,6 hexanediol, glycerin, trimethylolethane, trimethylolpropane, pentaerythritol, α-methylglucoside, sorbitol, mannitol, hydroxymethylglucoside, hydroxypropylglucoside, sucrose, 1,4-cyclohexanediol, cyclohexanedimethanol, hydroquinone, resorcinol, 2.2-bis (4-hydroxyphenyl)propane, and the like. Mixtures of monomeric initiators or their oxyalkylated oligomers may also be utilized. In one embodiment, polyols are the oxyalkylated oligomers of ethylene glycol, propylene glycol, glycerin or trimethylolpropane. In one embodiment, polyols for component (1)(b)(ii) include triethylene glycol, tripropylene glycol, etc.

Suitable alkylene oxides for component (2) of the presently claimed process include ethylene oxide, propylene oxide, butylene oxide, styrene oxide, epichlorohydrin, etc. and mixtures thereof. Mixtures of alkylene oxides may also be used herein. Preferred alkylene oxides for the invention include ethylene oxide and/or propylene oxide.

In an embodiment of the invention, the resultant polyether carbonates have a minimum of greater than 9 mole % of oxide adjacent to the carbonate group, based on 100 mole % of polyether carbonate. The amount of oxide adjacent to the carbonate group can also be at least about 14 mole %, based on 100 mole % of the polyether carbonate. It is also possible for the amount of oxide adjacent to the carbonate group to be less than or equal to 80 mole %, based on 100 mole % of the polyether carbonate. Thus, the amount of oxide adjacent to the carbonate group in the resultant polyether carbonates can range from 9 to 100 mole %, or it can range from 14 to 80 mole % (based on 100 mole % of the polyether carbonate).

The resultant polyether carbonates are characterized by a number average molecular weight of at least about 134.

The mixture of catalysts (3) comprises (a) at least one DMC catalyst and (b) at least one non-alkaline transesterification catalyst.

Suitable double metal cyanide (DMC) catalysts (3)(a) include both crystalline catalysts and non-crystalline (i.e. substantially amorphous) catalysts. Crystalline DMC catalysts are known and described in, for example, U.S. Pat. No. 6,303,833 and U.S. Pat. No. 6,303,533, the disclosures of which are herein incorporated by reference.

It is preferred that the DMC catalysts exhibit a substantially non-crystalline character (substantially amorphous) such as disclosed in U.S. Pat. No. 5,482,908 and U.S. Pat. No. 5,783,513, the entire contents of which are incorporated herein by reference thereto. These catalysts show significant improvements over the previously studied catalysts because the amounts of by-product cyclic carbonates are low. Thus, there is a clear advantage to using substantially non-crystalline DMC catalysts for the production of these polycarbonates, because of the lower amounts of propylene carbonate produced than the catalysts and processes in U.S. Pat. Nos. 4,500,704 and 4,826,953.

The catalysts disclosed in U.S. Pat. No. 5,482,908 and U.S. Pat. No. 5,783,513 differ from other DMC catalysts because these catalysts exhibit a substantially non-crystalline morphology. In addition, these catalysts are based on a combination of ligands, such as t-butyl alcohol and a polydentate ligand (polypropylene oxide polyol).

Examples of double metal cyanide compounds that can be used in the invention include, for example, zinc hexacyanocobaltate(III), zinc hexacyanoferrate(III), nickel hexacyanoferrate(II), cobalt hexacyano-cobaltate(III), and the like. Further examples of suitable double metal cyanide complexes are listed in U.S. Pat. No. 5,158,922, the teachings of which are incorporated herein by reference. Zinc hexacyanocobaltate(III) is preferred.

The solid DMC catalysts of the invention include an organic complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is particularly preferred.

The solid DMC catalysts of the invention include from about 5 to about 80 wt. %, based on amount of catalyst, of a polyether having a number average molecular weight greater than about 500. Preferred catalysts include from about 10 to about 70 wt. %, based on amount of catalyst, of the polyether; most preferred catalysts include from about 15 to about 60 wt. %, based on amount of catalyst, of the polyether. At least about 5 wt. %, based on amount of catalyst, of the polyether is needed to significantly improve the catalyst activity compared with a catalyst made in the absence of the polyether. Catalysts that contain more than about 80 wt. %, based on amount of catalyst, of the polyether generally are no more active, and they are impractical to isolate and use because they are typically sticky pastes rather than powdery solids.

Suitable polyethers include those produced by ring-opening polymerization of cyclic ethers, and include epoxide polymers, oxetane polymers, tetrahydrofuran polymers, and the like. Any method of catalysis can be used to make the polyethers. The polyethers can have any desired end groups, including, for example, hydroxyl, amine, ester, ether, or the like. Preferred polyethers are polyether polyols having average hydroxyl functionalities from about 2 to about 8 and number average molecular weights within the range of about 1000 to about 10,000, more preferably from about 1000 to about 5000. These are usually made by polymerizing epoxides in the presence of active hydrogen-containing initiators and basic, acidic, or organometallic catalysts (including DMC catalysts). Useful polyether polyols include poly(oxypropylene) polyols, EO-capped poly(oxypropylene) polyols, mixed EO-PO polyols, butylene oxide polymers, butylene oxide copolymers with ethylene oxide and/or propylene oxide, polytetramethylene ether glycols, and the like. Polyethylene glycols are generally not useful in the invention. In one embodiment, the poly(oxypropylene) polyols, may be specifically diols and/or triols having number average molecular weights within the range of about 2000 to about 4000.

The catalysts of the invention are characterized by any suitable means. The polyether and organic complexing agent are conveniently identified and quantified, for example, using thermogravimetric and mass spectral analyses. Metals are easily quantified by elemental analysis.

The catalysts of the invention can also be characterized using powder X-ray diffraction. The catalysts exhibit broad lines centered at characteristic d-spacings. For example, a zinc hexacyanocobaltate catalyst made using tert-butyl alcohol and a poly(oxypropylene) diol of about 4000 molecular weight has two broad signals centered at d-spacings of about 5.75 and 4.82 angstroms, and a somewhat narrower signal centered at a d-spacing of about 3.76 angstroms. This diffraction pattern is further characterized by the absence of sharp lines corresponding to highly crystalline zinc hexacyanocobaltate at d-spacings of about 5.07, 3.59, 2.54, and 2.28 angstroms.

The invention includes a method for preparing solid DMC catalysts useful for epoxide polymerization. The method comprises preparing a DMC catalyst in the presence of a polyether having a number average molecular weight greater than about 500, wherein the solid DMC catalyst contains from about 5 to about 80 wt. % of the polyether.

The DMC catalyst concentration in the inventive process is chosen to ensure a good control of the polyoxyalkylation reaction under the given reaction conditions. The catalyst concentration is at least 0.001 wt. % or higher, at least about 0.0024 wt. % or higher, or at least about 0.0025 wt. % or higher. The catalyst concentration is also typically less than or equal to about 0.2 wt. %, or less than or equal to about 0.1 wt. %, or less than or equal to about 0.06 wt. %. Thus, the catalyst concentration may range from about 0.001 wt. % to about 0.2 wt. %, or in the range from about 0.0024 wt. % to about 0.1 wt. %, or in the range of from about 0.0025 to about 0.06 wt. %, based on the weight of the polyol produced. The substantially non-crystalline DMC catalyst may be present in an amount ranging between any combination of these values, inclusive of the recited values.

Suitable non-alkaline transesterification catalysts (3)(b) include catalysts such as, for example, acetic acid, phosphoric acid, p-toluenesulfonic acid, methanesulfonic acid, tetrabutyl titanate, tetra-2-ethylhexyltitanate, stannous octoate, bis(dibutylchlorotin)oxide, etc. Mixtures of these catalysts can also be used. Preferred non-alkaline tranesterification catalyst for the invention are tetra-2-ethylhexyltitanate and tetrabutyl titanate.

In accordance with the present invention, the necessary starting materials and DMC catalyst are charged to the reactor and stripped for about 30 minutes at ambient temperature at 100° C. to 130° C. with a nitrogen sparge. Vacuum is optional but may be used if desired. The reactor contents are heated to a temperature of about 100° C. to 130° C. and alkylene oxide is added to initiate the catalyst. After initiation of the DMC catalyst, the transesterification catalyst is added and the remaining alkylene oxide is fed to the reactor at temperatures in the range of 130° C. to 240° C. Any residual alkylene oxide is digested after completion of the oxide feed for approximately 30 minutes to 60 minutes. Vacuum stripping is optional, but is typically for 20 to 30 minutes if done.

As will be appreciated by the foregoing description, the present invention is directed, in certain embodiments, to a process for preparing polyether carbonates that comprises simultaneously (A) transcarbonating and (B) alkoxylating (1) a mixture comprising (a) a compound selected from the group consisting of dialkyl carbonates, diaryl carbonates, alkylaryl carbonates, polycarbonates and mixtures thereof, wherein the compound has a molecular weight of from 90 to 6000, and (b) one or more hydroxyl group containing compounds selected from the group consisting of (i) alcohols which contain from 1 to 25 carbon atoms, (ii) polyols having a functionality of 2 to 6 and a number average molecular weight of less than 3000, and (iii) mixtures thereof; with (2) at least one alkylene oxide; in the presence of (3) a mixture of catalysts comprising (a) at least one DMC catalyst and (b) at least one non-alkaline transesterification catalyst.

In certain embodiments, the present invention is directed to the process of preparing polyether carbonates of the previous paragraph, wherein (1)(a) the compound has a molecular weight of from 104 to 5000.

In certain embodiments, the present invention is directed to the process of preparing polyether carbonates of the previous two paragraphs, wherein (1)(a) said compound is a selected from the group consisting of diethyl carbonate, dimethyl carbonate, diphenyl carbonate, an aliphatic polycarbonate diol having a molecular weight of 1000 to 4000 and mixtures thereof.

In certain embodiments, the present invention is directed to the process of preparing polyether carbonates of the previous three paragraphs, wherein (1)(b) said hydroxyl group containing compound is selected from the group consisting of (i) an alcohol comprising a blend of $C_{12}$-$C_{15}$ high purity primary alcohols, a blend of $C_9$-$C_{11}$ high purity primary alcohols, a blend of $C_{12}$-$C_{13}$ high purity primary alcohols, and mixtures thereof; and (ii) a polyol having a functionality of 2 to 4 and a molecular weight of 62 to 1000.

In certain embodiments, the present invention is directed to the process of preparing polyether carbonates of the previous four paragraphs, wherein (2) said alkylene oxide comprise ethylene oxide, propylene oxide, or mixtures thereof.

In certain embodiments, the present invention is directed to the process of preparing polyether carbonates of the previous five paragraphs, wherein the resultant polyether carbonates have greater than 9 mole % of oxide adjacent to the carbonate group.

In certain embodiments, the present invention is directed to the process of preparing polyether carbonates of the previous six paragraphs, wherein the resultant polyether carbonates have from 14 to 80 mole % of oxide adjacent to the carbonate group.

In certain embodiments, the present invention is directed to the process of preparing polyether carbonates of the previous seven paragraphs, wherein (3)(a) said at least one DMC catalyst comprises a substantially non-crystalline DMC catalyst, and (3)(b) said at least one non-alkaline transesterification catalyst is one or more of tetra-2-ethylhexyltitanate and tetrabutyl titanate.

In certain embodiments, the present invention is directed to polyether carbonates that comprise the reaction product of (1) a mixture comprising (a) a compound having a molecular weight of 90 to 6000 and which is selected from the group consisting of dialkyl carbonates, diaryl carbonates, alkylaryl carbonates, polycarbonates and mixtures thereof, and (b) one or more hydroxyl group containing compounds selected from the group consisting of (i) alcohols which contain from 1 to 25 carbon atoms, (ii) polyols having a functionality of 2 to 6 and a number average molecular weight of less than 3000, and (iii) mixtures thereof; with (2) at least one alkylene oxide; in the presence of (3) a mixture of catalysts comprising (a) at least one DMC catalyst and (b) at least one non-alkaline transesterification catalyst; wherein the reaction comprises simultaneous transcarbonation and alkoxylation.

In certain embodiments, the present invention is directed to the polyether carbonates of the previous paragraph, wherein (1)(a) the compound has a molecular weight of from 104 to 5000.

In certain embodiments, the present invention is directed to the polyether carbonates of the previous two paragraphs, wherein (1)(a) said compound is a selected from the group consisting of diethyl carbonate, dimethyl carbonate, diphenyl carbonate, an aliphatic polycarbonate diol having a molecular weight of 1000 to 4000 and mixtures thereof.

In certain embodiments, the present invention is directed to the polyether carbonates of the previous three paragraphs, wherein (1)(b) said hydroxyl group containing compound is selected from the group consisting of (i) an alcohol comprising a blend of $C_{12}$-$C_{15}$ high purity primary alcohols, a blend of $C_9$-$C_{11}$ high purity primary alcohols, a blend of $C_{12}$-$C_{13}$ high purity primary alcohols, and mixtures thereof; and (ii) a polyol having a functionality of 2 to 4 and a molecular weight of 62 to 1000.

In certain embodiments, the present invention is directed to the polyether carbonates of the previous four paragraphs, wherein (2) said alkylene oxide comprise ethylene oxide, propylene oxide, or mixtures thereof.

In certain embodiments, the present invention is directed to the polyether carbonates of the previous five paragraphs, wherein the resultant polyether carbonates have greater than 9 mole % of oxide adjacent to the carbonate group.

In certain embodiments, the present invention is directed to the polyether carbonates of the previous six paragraphs, wherein the resultant polyether carbonates have from 14 to 80 mole % of oxide adjacent to the carbonate group.

In certain embodiments, the present invention is directed to the polyether carbonates of the previous seven paragraphs, wherein (3)(a) said at least one DMC catalyst comprises a substantially non-crystalline DMC catalyst, and (3)(b) said at least one non-alkaline transesterification catalyst is one or more of tetra-2-ethylhexyltitanate and tetrabutyl titanate.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following materials were used in the examples.
Carbonate A: diethylcarbonate
Carbonate B: a 2000 molecular weight aliphatic polycarbonate diol with a hydroxyl number of about 56 and a viscosity of 2,300 mPa·s at 75° C., commercially available as Desmophen C2200 from Covestro LLC
Alcohol A: a blend of $C_{12}$-$C_{15}$ high purity primary alcohols, commercially available from Shell Chemical as Neodol® 25
Catalyst A: an amorphous double metal cyanide (DMC) catalyst, similar to Example 2 and Example 3 as disclosed in U.S. Pat. No. 5,482,908
Catalyst B: tetra-2-ethylhexyltitanate, commercially available as Tyzor TOT® from Dorf Ketal Specialty Example 1

Carbonate A (132 g), Alcohol A (12 g) and 51 mg Catalyst A were added to a 1.5 L stainless steel reactor vessel. The contents were vacuum degassed (20 mmHg) at ambient temperature and then the reactor was closed. The contents were heated to 130° C. and 15 g propylene oxide (PO) was added to activate Catalyst A. After digesting PO to a constant reactor pressure, 5 g of a Catalyst B solution (0.5 wt % dissolved in Carbonate A) was added to the reactor. The reactor temperature was increased to 150° C. and 856 g PO was fed over a 4 hour period. After completion of the PO addition, the reactor contents were heated at 150° C. for 1 hour, cooled and then removed from the reactor. GPC analysis showed complete conversion of Carbonate A, and the NMR analysis was consistent with a product having propylene oxide units inserted into carbonate linkages.

Example 2

Carbonate B (200 g), Alcohol A (25 g) and 20 mg Catalyst A were added to a 1.5 L stainless steel reactor vessel. The contents were nitrogen sparged at 130° C. at ambient pressure for 20 minutes and then the reactor was closed. The contents were maintained at 130° C. and 20 g PO were added to activate Catalyst A. After digesting PO to a constant reactor pressure, 20 g of a Catalyst B solution (10 wt % dissolved in Carbonate B) was added to the reactor. The reactor temperature was increased to 160° C. and 180 g PO were fed over a 3 hour period. After completion of the PO addition, the reactor contents were heated at 160° C. for 0.5 hour, and then vacuum stripped for 20 minutes. GPC analysis showed complete conversion of Carbonate A with a polydispersity of 1.86, and the NMR analysis was consistent with a product having propylene oxide units inserted into carbonate linkages.

Table 1 illustrates the benefit of a dual catalyst system in accordance with the present invention. The general procedure as described set forth above in Example 1 was followed except that in Example 3, only Catalyst A was used, and in Example 4, only Catalyst B was used.

TABLE 1

| Example | Catalyst | Polydispersity | PO Adjacent to Carbonate, %* |
|---------|----------|----------------|------------------------------|
| 3       | B        | 1.64           | 2                            |
| 4       | A        | 1.22           | 9                            |
| 1       | A + B    | 1.16           | 14                           |

*as determined by NMR analysis

What is claimed is:

1. A process for preparing a polyether carbonate product, which comprises simultaneously:
   (A) transcarbonating
   and
   (B) alkoxylating
      (1) a mixture comprising
         (a) a compound which is selected from the group consisting of dialkyl carbonates, diaryl carbonate, alkylaryl carbonates, polycarbonates and mixtures thereof, wherein said compound has a number average molecular weight of from 90 to 6000;
         and
         (b) one or more hydroxyl group containing compounds selected from the group consisting of (i) alcohols which contain from 1 to 25 carbon atoms, (ii) polyols having a functionality of 2 to 6 and a number average molecular weight of less than 3000 and (iii) mixtures thereof;
      with
      (2) at least one alkylene oxide;
      in the presence of
      (3) a mixture of catalysts comprising
         (a) at least one DMC catalyst,
         and
         (b) at least one non-alkaline transesterification catalyst.

2. The process of claim 1, wherein (1)(a) said compound has a number average molecular weight of from 104 to 5000.

3. The process of claim 1, wherein (1)(a) said compound is a selected from the group consisting of diethyl carbonate, dimethyl carbonate, diphenyl carbonate, an aliphatic polycarbonate diol having a number average molecular weight of 1000 to 4000 and mixtures thereof.

4. The process of claim 1, wherein (1)(b) said hydroxyl group containing compound is selected from the group consisting of (i) an alcohol comprising a blend of $C_{12}$-$C_{15}$ high purity primary alcohols, a blend of $C_9$-$C_{11}$ high purity primary alcohols, a blend of $C_{12}$-$C_{13}$ high purity primary alcohols, and mixtures thereof; and (ii) a polyol having a functionality of 2 to 4 and a number average molecular weight of 62 to 1000.

5. The process of claim 1, wherein (2) said alkylene oxide comprise ethylene oxide, propylene oxide, or mixtures thereof.

6. The process of claim 1, wherein the resultant polyether carbonates have greater than 9 mole % of oxide adjacent to the carbonate group.

7. The process of claim 1, wherein the resultant polyether carbonates have from 14 to 80 mole % of oxide adjacent to the carbonate group.

8. The process of claim 1, wherein (3)(a) said at least one DMC catalyst comprises a substantially non-crystalline DMC catalyst, and (3)(b) said at least one non-alkaline transesterification catalyst is one or more of tetra-2-ethyl-hexyltitanate and tetrabutyl titanate.

9. A polyether carbonate comprising the reaction product of:
(1) a mixture comprising
  (a) a compound having a number average molecular weight of from 90 to 6000 and which is selected from the group consisting of dialkyl carbonates, diaryl carbonates, alkylaryl carbonates and polycarbonates; and
  (b) one or more hydroxyl group containing compounds selected from the group consisting of (i) alcohols containing from 1 to 25 carbon atoms, (ii) polyols having a functionality of 2 to 6 and a number average molecular weight of less than 3000 and (iii) mixtures thereof;
with
(2) at least one alkylene oxide;
in the presence of
(3) a mixture of catalysts comprising
  a at least one DMC catalyst,
  and
  (b) at least one non-alkaline transesterification catalyst;
wherein the reaction simultaneously comprises transcarbonation and alkoxylation.

10. The polyether carbonate of claim 9, wherein (1)(a) said compound has a number average molecular weight of from 104 to 5000.

11. The polyether carbonate of claim 9, wherein (1)(a) said compound is a selected from the group consisting of diethyl carbonate, dimethyl carbonate, diphenyl carbonate, an aliphatic polycarbonate diol having a number average molecular weight of 1000 to 4000 and mixtures thereof.

12. The polyether carbonate of claim 9, wherein (1)(b) said hydroxyl group containing compound is selected from the group consisting of (i) an alcohol comprising a blend of $C_{12}$-$C_{15}$ high purity primary alcohols, a blend of $C_9$-$C_{11}$ high purity primary alcohols, a blend of $C_{12}$-$C_{13}$ high purity primary alcohols, and mixtures thereof; and (ii) a polyol having a functionality of 2 to 4 and a number average molecular weight of 62 to 1000.

13. The polyether carbonate of claim 9, wherein (2) said alkylene oxide comprise ethylene oxide, propylene oxide, or mixtures thereof.

14. The polyether carbonate of claim 9, wherein the resultant polyether carbonates have greater than 9 mole % of oxide adjacent to the carbonate group.

15. The polyether carbonate of claim 9, wherein the resultant polyether carbonates have from 14 to 80 mole % of oxide adjacent to the carbonate group.

16. The polyether carbonate of claim 9, wherein (3)(a) said at least one DMC catalyst comprises a substantially non-crystalline DMC catalyst, and (3)(b) said at least one non-alkaline transesterification catalyst is one or more of tetra-2-ethylhexyltitanate and tetrabutyl titanate.

* * * * *